United States Patent
Lee

(10) Patent No.: US 8,374,648 B2
(45) Date of Patent: Feb. 12, 2013

(54) METHOD FOR PERFORMING COMMUNICATION FUNCTION IN WIRELESS TERMINAL

(75) Inventor: Moon-Kwang Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1268 days.

(21) Appl. No.: 11/835,219

(22) Filed: Aug. 7, 2007

(65) Prior Publication Data

US 2008/0032743 A1    Feb. 7, 2008

(30) Foreign Application Priority Data

Aug. 7, 2006 (KR) .................. 10-2006-0074182

(51) Int. Cl.
  *H04M 1/00* (2006.01)
  *H04B 1/38* (2006.01)
(52) U.S. Cl. ............. 455/558; 455/550.1; 455/411
(58) Field of Classification Search ............ 455/558
  See application file for complete search history.

(56) References Cited

U.S. PATENT DOCUMENTS 7,146,161 B2 * 12/2006 Chou .................. 455/418
7,840,234 B2 * 11/2010 Chan .................. 455/558
2001/0016502 A1   8/2001 Shirai
2002/0169001 A1 * 11/2002 Itazawa .............. 455/557
2005/0181829 A1   8/2005 Cho et al.

FOREIGN PATENT DOCUMENTS

| JP | 2001-238260 | 8/2001 |
| KR | 1020050081854 | 8/2005 |
| WO | WO 04/002176 | 12/2003 |
| WO | WO 2004/100582 | 11/2004 |

OTHER PUBLICATIONS

Digital Cellular Telecommunications System (Phase 2+); Specification of the Subscriber I Module—Mobile Equipment (SIM-ME) Interface, Release 1999, Jun. 2005.

* cited by examiner

*Primary Examiner* — Rafael Pérez-Gutiérrez
*Assistant Examiner* — German Viana Di Prisco
(74) *Attorney, Agent, or Firm* — The Farrell Law Firm, P.C.

(57) ABSTRACT

A method for performing a communication function after a Subscriber Identity Module (SIM) card is withdrawn from a wireless terminal is provided. The method includes, if the SIM card is inserted into the wireless terminal, copying information stored in the SIM card into a memory of the wireless terminal; and if the SIM card is withdrawn, performing the communication function by using the information of the SIM card, copied into the memory of the wireless terminal, during a predetermined time.

6 Claims, 3 Drawing Sheets

METHOD FOR PERFORMING COMMUNICATION FUNCTION IN WIRELESS TERMINAL

PRIORITY

This application claims priority under 35 U.S.C. §119(a) to a Korean Patent Application entitled "Method For Performing Communication Function In Wireless Terminal" filed in the Korean Intellectual Property Office on Aug. 7, 2006 and assigned Serial No. 2006-74182, the contents of which are incorporated herein by reference.

BACKGROUND OF THE INVENTION

1. Field of the Invention

The present invention relates to a method for performing a communication function in a wireless terminal, and in particular, to a method for performing a communication function in a wireless terminal, which enables the communication function to be continued even after a Subscriber Identity Module (SIM) card is abnormally withdrawn from the wireless terminal.

2. Description of the Related Art

Unlike a Code Division Multiple Access (CDMA) terminal, a Global System for Mobile communication (GSM) terminal generally has a Subscriber Identity Module (SIM) card mounted therein. The SIM card is a smart card being inserted/withdrawn into/from the wireless terminal, which includes therein a controller and a memory chip for storing various user information.

In order to insert the SIM card into the wireless terminal, a battery is separated from the wireless terminal and the SIM card is inserted into the wireless terminal. Also, in order to draw the SIM card from the wireless terminal, the SIM card cannot be withdrawn from the wireless terminal before the battery is separated from the wireless terminal again, i.e., before the wireless terminal is powered off.

With the recent development of mechanism, a wireless terminal has been designed, into/from which the SIM card can be easily inserted/withdrawn even without separating the battery from the wireless terminal. However, in such a wireless terminal, the SIM card may be abnormally withdrawn therefrom in unexpected circumstances.

SUMMARY OF THE INVENTION

An aspect of the present invention is to substantially solve at least the above problems and/or disadvantages and to provide at least the advantages below. Accordingly, one aspect of the present invention is to provide a method for performing a communication function in a wireless terminal, in which it is possible to perform a communication function in the wireless terminal even after a Subscriber Identity Module (SIM) card is abnormally withdrawn from the wireless terminal.

According to one aspect of the present invention, there is provided a method for performing a communication function after a SIM card is withdrawn from a wireless terminal. The method includes if the SIM card is inserted into the wireless terminal, copying information stored in the SIM card into a memory of the wireless terminal; and if the SIM card is withdrawn, performing the communication function by using the information of the SIM card, copied into the memory of the wireless terminal, during a predetermined time.

According to another aspect of the present invention, there is provided a method for performing a communication function after a SIM card is withdrawn from a wireless terminal. The method includes if the SIM card is inserted into the wireless terminal, copying information stored in the SIM card into a memory of the wireless terminal; if the SIM card is withdrawn while performing the communication function by using the information of the SIM card copied into the memory of the wireless terminal, determining if a predetermined time has passed; and powering off the wireless terminal if the SIM card is not inserted even after the predetermined time has passed.

According to yet another aspect of the present invention, there is provided a method for performing a communication function after a SIM card is withdrawn from a wireless terminal. The method includes, if the SIM card is inserted into the wireless terminal, copying information stored in the SIM card into a memory of the wireless terminal; if the SIM card is withdrawn while performing the communication function by using the information stored in the SIM card, performing the communication function by using the information of the SIM card copied into the memory of the wireless terminal; determining if a predetermined time has passed, while performing the communication function by using the information of the SIM card copied into the memory of the wireless terminal; if the SIM card is inserted before the predetermined time passes, performing the communication function by using the information of the SIM card; and if the SIM card is not inserted even after the predetermined time passes, powering off the wireless terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
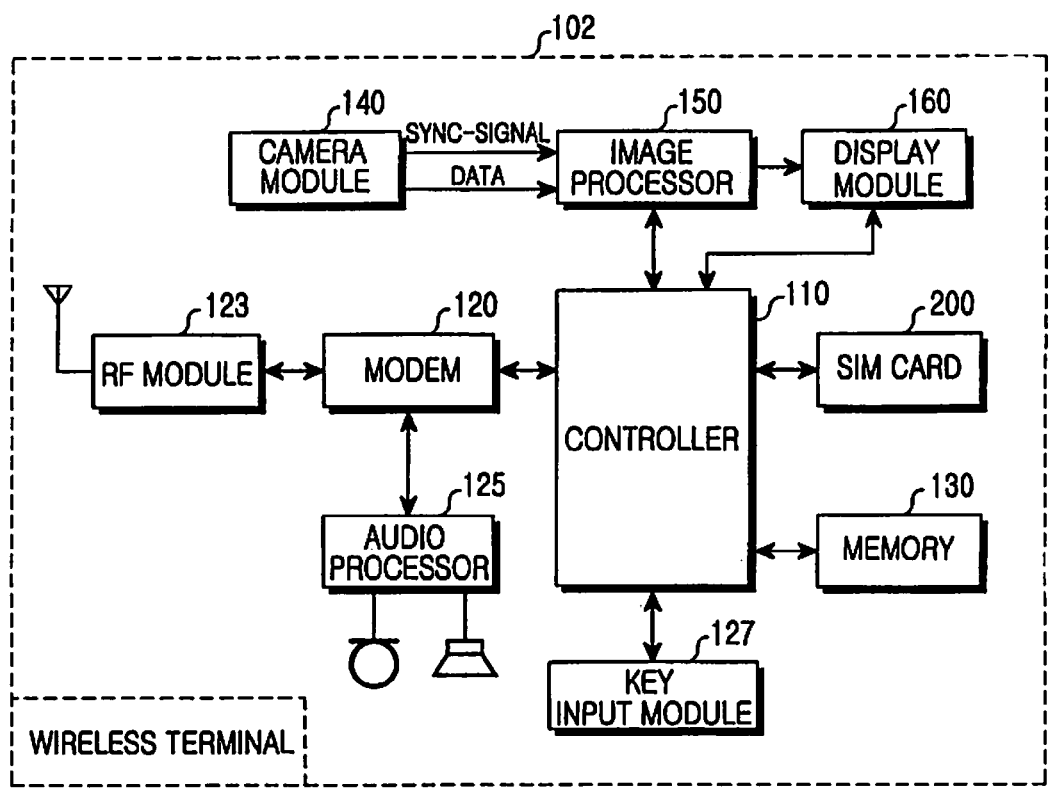
FIG. 1 is a block diagram illustrating the construction of a wireless terminal according to of the present invention.

Preferred embodiments of the present invention will be described in detail herein below with reference to the accompanying drawings. It should be noted that the similar components are designated by similar reference numerals although they are illustrated in different drawings.

FIG. 1 is a block diagram illustrating the construction of a wireless terminal 102 according to the present invention.

In FIG. 1, a Radio Frequency (RF) module 123 performs a wireless communication function of the wireless terminal. The RF module 123 includes an RF transmitter for up-converting and amplifying frequencies of transmitted signals, an RF receiver for low noise-amplifying received signals and down-converting frequencies of the received signals, etc. A modem 120 includes a transmitter for coding and modulating the transmitted signals, a receiver for decoding and demodulating the received signals, etc. An audio processor 125 may include a codec classified as a data codec for processing packet data, etc., and an audio codec for processing audio signals including voice, etc. The audio processor 125 converts digital audio signals received from the modem 120 into analog signals through the audio codec for reproduction, or converts analog audio signals generated and transmitted from a microphone into digital audio signals through the audio codec, and transmits the converted digital audio signals to the modem 120. The codec may be separately provided or be included in the controller 110.

A memory 130 may include a program memory and a data memory. The program memory may store programs for controlling a general operation of the wireless terminal 102. The program memory may also store programs for controlling the user information of the Subscriber Identity Module (SIM) inserted into the wireless terminal to be stored in the specific security area of the memory 130, and controlling communication function to be performed by using the user information of the SIM card after the SIM card is withdrawn according to the embodiment of the present invention. The data memory temporarily stores data generated when the programs are performed.

Further, the memory 130 may store the user information of the SIM card 200 in an area allocated as the specific security area.

The SIM card 200 has a chip-type card in which the user information including telephone numbers are stored in order to use the wireless terminal 102 in a GSM mobile communication area. The SIM card 200 can be inserted/withdrawn into/from the wireless terminal, and allows the wireless terminal 102 to perform the communication function by using the user information stored in the SIM card 200.

The controller 110 controls general operations of the wireless terminal. The controller 110 may also include the modem 120 and a codec. If the SIM card 200 is inserted when the wireless terminal 102 is powered on, the controller 110 controls the user information of the SIM card to be stored in the specific security area of the memory 130 according to the embodiment of the present invention.

Conversely, if the SIM card 200 is withdrawn when the wireless terminal 102 is powered on, the controller 110 controls the wireless terminal 102 to maintain a communication function for performing both call origination and termination by using the user information of the SIM card stored in the specific security area of the memory 130 during a predetermined time according to the embodiment of the present invention.

If the SIM card 200, which has been withdrawn when the wireless terminal 102 is powered on, is not inserted during a predetermined time, the controller 110 can control the wireless terminal 102 to be powered off according to the embodiment of the present invention. The controller 110 can also control the user information of the SIM card to be deleted after the wireless terminal is powered off, the user information of the SIM card being stored in the specific security area of the memory 130.

A camera module 140 includes a camera sensor for photographing image data and converting photographed optical signals into electrical signals, and a signal processor for converting analog image signals photographed by the camera sensor into digital data. Herein, it is assumed that the camera censor is a Charge-Coupled Device (CCD) sensor, and the signal processor may be realized by a Digital Signal Processor (DSP). In addition, the camera censor may be integrated with the signal processor, or may also be constructed separately from the signal processor.

An image processor 150 generates screen data for displaying image signals output from the camera module 140. The image processor 150 processes image signals, which are output from the camera module 140, by the frame and outputs the frame image data according to the characteristics and sizes of the display module 160. The image processor 150 also includes an image codec, compresses the frame image data, which are displayed on the display module 160, by means of a predetermined scheme, and restores the compressed frame image data into original frame image data. Herein, the image codec may include a JPEG codec, a MPEG4 codec, a Wavelet codec, etc. It is assumed that the image processor 150 has an On Screen Display (OSD) function, and therefore can output OSD data according to displayed screen sizes under the control of the controller 110.

The display module 160 displays both the image signals output from the image processor 150 on the screen and user data output from the controller 110. Herein, the display module 160 may use a Liquid Crystal Display (LCD). As such, the display module 160 may include an LCD controller, a memory capable of storing image data, an LCD display element, etc. Herein, if the LCD employs a touch screen type, the display module 160 may operate as an input module.

If the SIM card 200 is withdrawn when the wireless terminal 102 is powered on, the display module 160 can display a message reporting that the SIM card has been abnormally withdrawn and the wireless terminal 102 is to be powered off after passage of a predetermined time according to the embodiment of the present invention.

A key input module 127 has keys for inputting numeral and character information, and function keys for setting various functions.

Hereinafter, an operation for maintaining the communication function after the SIM card is abnormally withdrawn from the wireless terminal 102 will be described in detail with reference to FIGS. 2 and 3.

Figure 2:
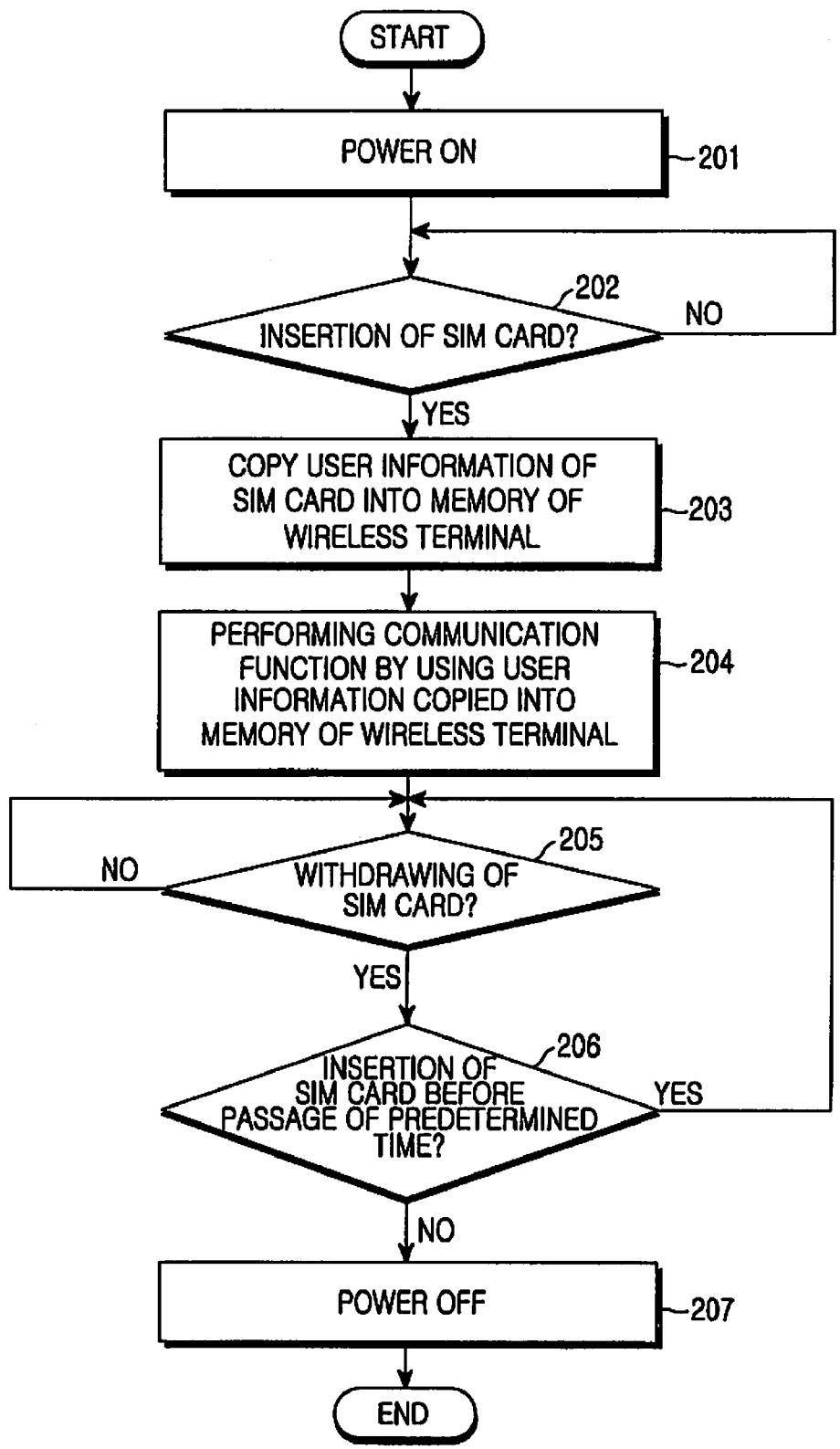
FIG. 2 is a flowchart illustrating a method for maintaining a communication function after a Subscriber Identity Module (SIM) card is withdrawn from the wireless terminal according to the present invention.

FIG. 2 is a flowchart illustrating a method for maintaining the communication function after the SIM card is withdrawn from the wireless terminal according to of the present invention.

In step 201, in which the wireless terminal 102 is powered on, if the SIM card 200 is inserted into the wireless terminal, the controller 110 detects the insertion of the SIM card 200 in step 202, and copies the user information into the memory 130 in step 203. For example, in step 203, the controller 110 stores the user information in the specific security area within the memory 130, so as to protect user personal information stored in the SIM card 200.

If the user information of the inserted SIM card 200 is stored in the memory 130, the controller 110 performs both a call origination and a termination function in the wireless terminal 102, while exchanging information with a base station by using the user information of the SIM card 200 stored in the memory 130 in step 204.

While the communication function of the wireless terminal is performed in step 204, if the SIM card 200 is withdrawn from the wireless terminal, that is, if the SIM card 200 is withdrawn therefrom when the wireless terminal 102 is powered on, the controller 110 detects that the SIM card has been abnormally withdrawn, and determines if a predetermined time has passed after the SIM card 200 is withdrawn in step 205.

Further, when the SIM card 200 has been withdrawn, the controller 110 allows a message or an icon to be displayed, which reports that the SIM card 200 has been withdrawn, and simultaneously allows a message or an alarm sound to generate, which reports that the wireless terminal 102 is to be powered off after passage of a predetermined time.

After the SIM card 200 has been withdrawn, the controller 110 determines if a predetermined time has passed while performing the communication function of the wireless terminal 102 by using the user information of the SIM card 200 stored in the memory 130.

If the SIM card 200 is inserted before the predetermined time passes, the controller 110 detects the insertion of the SIM card, and allows the wireless terminal 102 to perform the communication function by using the user information of the SIM card 200 stored in the memory 130, in step 206.

However, if the SIM card 200 is not inserted even after the predetermined time has passed, the controller 110 detects non-insertion of the SIM card in step 206, and allows the wireless terminal 102 to be powered off in step 207. After the wireless terminal 102 is powered off in step 207, the controller 110 can delete the user information of the SIM card 200 stored in the specific security area of the memory 130.

Figure 3:
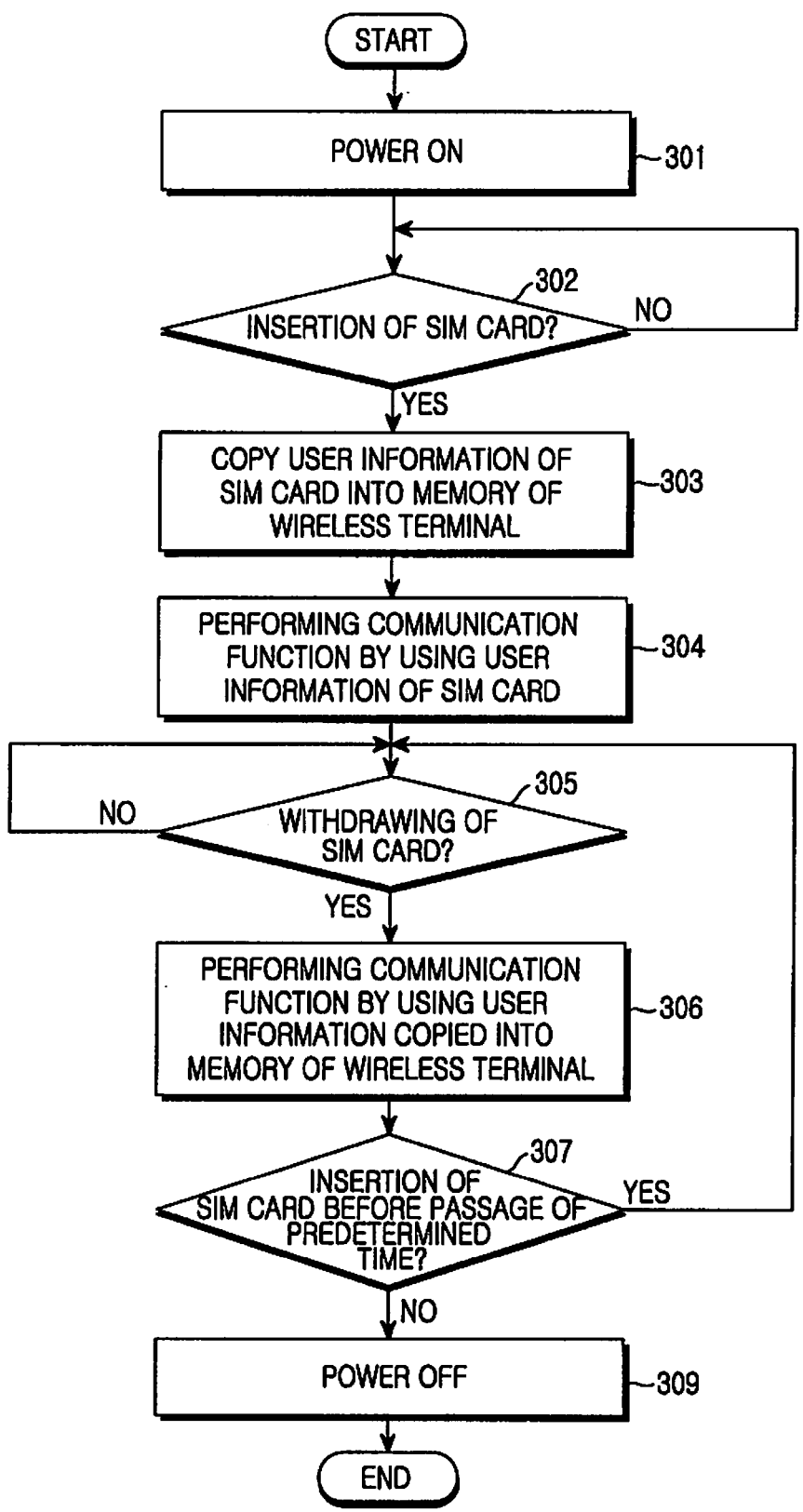
FIG. 3 is a flowchart illustrating a method for maintaining a communication function after a SIM card is withdrawn from a wireless terminal according to another embodiment of the present invention.

FIG. 3 is a flowchart illustrating a method for maintaining the communication function after the SIM card is withdrawn from the wireless terminal 102 according to another embodiment of the present invention.

Hereinafter, the embodiment of the present invention will be described in detail with reference to FIG. 1.

In step 301 in which the wireless terminal 102 is powered on, if the SIM card 200 is inserted into the wireless terminal 102, the controller 110 detects the insertion of the SIM card in step 302, and copies the user information stored in the SIM card 200 into the memory 130 in step 303. Here, in step 303, the controller 110 stores the user information stored in the SIM card 200 in the specific security area within the memory 130, so as to protect user personal information stored in the SIM card 200.

If the user information of the inserted SIM card 200 is stored in the memory 130, the controller 110 performs both a call origination and a termination function in the wireless terminal 102, while exchanging information with the base station by using the user information of SIM card 200 inserted into the wireless terminal 102.

While the communication function of the wireless terminal 102 by using the user information of the SIM card 200 inserted into the wireless terminal 102 is performed, if the SIM card 200 is withdrawn from the wireless terminal 102, that is, if the SIM card 200 is withdrawn therefrom when the wireless terminal is powered on, the controller 110 detects that the SIM card has been abnormally withdrawn, and performs the communication function by using the user information of the SIM card 200 stored in the memory 130 in step 306.

Herein, while performing the communication function by using the user information of the SIM card 200 stored in the memory 130, the controller 110 determines if a predetermined time has passed after the SIM card 200 has been withdrawn. Further, when the SIM card 200 has been withdrawn, the controller 110 allows a message or an icon to be displayed, which reports that the SIM card 200 has been withdrawn, and simultaneously generates a message or an alarm sound, which reports that the wireless terminal 102 is to be powered off after passage of a predetermined time.

If the SIM card 200 is inserted before the predetermined time passes, the controller 110 detects the insertion of the SIM card, and allows the wireless terminal 102 to perform the communication function by using the user information of the inserted SIM 200 in step 307.

However, if the SIM card 200 is not inserted even after the predetermined time has passed, the controller 110 detects non-insertion of the SIM card in step 307, and allows the wireless terminal 102 to be powered off in step 308. After the wireless terminal is powered off in step 308, the controller 110 can delete the user information of the SIM card 200 stored in the specific security area of the memory 130.

As described above in FIGS. 2 and 3, the user information of the SIM card 200 inserted into the wireless terminal 102 is copied and stored in the memory of the wireless terminal 102, so that it is possible to more quickly access and provide the user information when the base station requests the information of the SIM card 200. In addition, when the SIM card 200 has been abnormally withdrawn, it is possible to perform a communication function of the wireless terminal 102.

As described above, the present invention provides a method for performing a communication function after a SIM card is withdrawn from a wireless terminal 102, so that it is possible to maintain a communication function of the wireless terminal 102 even after the SIM card is abnormally withdrawn therefrom, and a base station can rapidly access information of the SIM card.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for performing a communication function after a Subscriber Identity Module (SIM) card is withdrawn from a wireless terminal, the method comprising the steps of:
   when the SIM card is inserted into the wireless terminal, copying original information stored in the SIM card into a memory of the wireless terminal and performing the communication function by using the original information of the SIM card; and
   when the SIM card is not inserted into the wireless terminal by withdrawing the SIM card from the wireless terminal, performing the communication function by using the copied information of the SIM card from the memory of the wireless terminal, only during a predetermined time from when the SIM card is withdrawn.

2. The method as claimed in claim 1, further comprising, if the SIM card is not inserted even after the predetermined time has passed, powering off the wireless terminal.

3. The method as claimed in claim 2, further comprising, if the wireless terminal is powered off, deleting the information of the SIM card stored in the memory of the wireless terminal.

4. The method as claimed in claim 1, further comprising, if the SIM card is inserted before the predetermined time passes, performing the communication function by using the original information of the SIM card.

5. The method as claimed in claim 1, wherein the original information stored in the SIM card is copied into a specific security area of the memory in the wireless terminal.

6. The method as claimed in claim 1, wherein, if the SIM card is withdrawn from the wireless terminal, it is reported that the SIM card is withdrawn and the wireless terminal is to be powered off after passage of the predetermined time.

* * * * *